(12) United States Patent
Faucher et al.

(10) Patent No.: US 11,608,597 B2
(45) Date of Patent: Mar. 21, 2023

(54) COMPLEX OF POLYMERS, PREPARATION AND USE

(71) Applicant: SPCM SA, Andrezieux Boutheon (FR)

(72) Inventors: Gatien Faucher, Andrezieux Boutheon (FR); Damien Fougerouse, Andrezieux Boutheon (FR); René Hund, Andrezieux Boutheon (FR)

(73) Assignee: SPCM SA, Andrezieux Boutheon (FR)

( * ) Notice: Subject to any disclaimer, the term of this patent is extended or adjusted under 35 U.S.C. 154(b) by 253 days.

(21) Appl. No.: 17/045,867

(22) PCT Filed: May 7, 2019

(86) PCT No.: PCT/FR2019/051039
§ 371 (c)(1),
(2) Date: Oct. 7, 2020

(87) PCT Pub. No.: WO2019/215413
PCT Pub. Date: Nov. 14, 2019

(65) Prior Publication Data
US 2021/0140111 A1   May 13, 2021

(30) Foreign Application Priority Data
May 7, 2018  (FR) ...................... 1853919

(51) Int. Cl.
*C08F 271/00* (2006.01)
*D21H 21/18* (2006.01)
*D21H 17/37* (2006.01)
*D21H 17/45* (2006.01)
*D21H 23/04* (2006.01)

(52) U.S. Cl.
CPC .......... *D21H 21/18* (2013.01); *C08F 271/00* (2013.01); *D21H 17/375* (2013.01); *D21H 17/455* (2013.01); *D21H 23/04* (2013.01)

(58) Field of Classification Search
CPC ....... C08F 271/00; C08F 16/28; C08F 220/06
See application file for complete search history.

(56) References Cited

U.S. PATENT DOCUMENTS

| | | | | |
|---|---|---|---|---|
| 5,753,759 | A | * | 5/1998 | Hartmann ........... C09B 67/0085 525/218 |
| 7,001,953 | B2 | * | 2/2006 | Chen .................... C09K 8/5083 525/123 |
| 8,021,516 | B2 | | 9/2011 | Chen et al. |
| 9,546,246 | B2 | * | 1/2017 | Hund ..................... C08G 73/02 |

OTHER PUBLICATIONS

International Search Report (and English translation) and Written Opinion of the International Searching Authority for International Application No. PCT/FR2019/051039 dated Aug. 28, 2019.

* cited by examiner

*Primary Examiner* — Mark S Kaucher
(74) *Attorney, Agent, or Firm* — Heslin Rothenberg Farley & Mesiti P.C.

(57) ABSTRACT

The present invention relates to a complex of polymers and to the use thereof in a method of making paper, cardboard or the like. This complex of polymers is obtained by polymerizing water-soluble monomers: in the presence of a host polymer that comprises vinylamine functions and of a non-polymeric transfer agent, and in the absence of a branching or crosslinking agent of the ethylenic polyfunctional type. It is obtained as from a mass ratio of anionic monomer to water that is greater than 0.035.

19 Claims, No Drawings

COMPLEX OF POLYMERS, PREPARATION AND USE

CROSS REFERENCE TO RELATED APPLICATIONS

This application is a national stage filing under section 371 of International Application No. PCT/FR2019/051039 filed on May 7, 2019, and published in English on Nov. 14, 2019 as WO 2019/215413, which claims priority to French Application No. 1853919, filed on May 7, 2018. The entire contents of WO 2019/215413 are hereby incorporated herein by reference.

FIELD OF THE INVENTION

The present invention relates to a complex of polymers or "polymer complex" that results from polymerization of one or more water-soluble monomers in the presence of a previously prepared polymer.

Another aspect of the invention relates to the use of this polymer complex as a dry strength agent for implementation in making paper, cardboard, or the like.

STATE OF THE PRIOR ART

Papers and cardboards that are increasingly strong are being sought, in particular for the packaging industry.

The dry strength of paper is, by definition, the strength of a normally dry sheet. Strength values conventionally give a measurement of the dry strength of paper. Reference may be made, in particular, to bursting strength, tensile strength, compressive strength, and delamination or peel strength, etc.

Using water-soluble cationic polymers for enhancing the strength characteristics of paper is well known. By nature, they can attach directly to the anionic cellulose and increase the number of inter-fiber hydrogen bonds so as to improve the strength of the paper in its dry state.

Furthermore, they can also impart a cationic charge to it so that, in association with anionic polymers, said anionic polymers are attached to the cellulose, thereby improving the dry strength of the sheet.

Other polymers can also be added to the cellulose suspension in order to improve the properties of the sheet of paper. However, adding polymers of different molecular weights can be problematic.

The person skilled in the art is aware of the difficulties related to preparing a homogenous composition containing two polymers having distinct molecular weights.

Due to the difference in molecular weight, phase separation can appear while the polymers are being dissolved to form a solution.

The person skilled in the art has therefore developed polymerization methods making it possible to mitigate the phase separation problem.

For example, U.S. Pat. Nos. 7,001,953 and 8,021,516 disclose water-soluble polymers that can be used in treating sludge or in making paper. Those polymers are obtained by polymerizing monomers in the presence of a polymer that has been prepared previously and independently. As indicated in those documents, the polymer already synthesized and the polymer being synthesized substantially do not undergo grafting to each other.

What actually happens is that an intercalated polymer is formed in the presence of a host polymer. The host polymer is not grafted during the polymerization of the monomers that can be implemented in the presence of a branching agent. That method thus makes it possible to obtain a mixture of two distinct and intercalated polymers. That structure of intercalated polymers makes it possible to obtain properties distinct from the properties resulting from a mixture of non-intercalated polymers.

U.S. Pat. No. 9,546,246 to the Applicant makes it possible to mitigate the problem of phase separation. That patent discloses a complex and its use as an agent for treating mineral fillers and in particular for implementation in making paper, cardboard or the like.

However, the products described in the latter patent suffer from the drawback of being of high viscosity (about 10,000 centipoises (cps)), and they are therefore difficult to incorporate into solutions or dispersions of low viscosity. Furthermore, such high viscosity tends to increase over time, and the product thus has a short shelf-life of only a few months.

One of the problems that the Applicant proposes to solve is to develop a novel polymer complex that does not suffer from phase separation, i.e. that is a homogeneous mixture of interconnected polymers. In addition, the novel complex offers the advantage of being stable in terms of viscosity over time.

Another aspect of the invention relates to a novel dry strength agent for implementation in making paper, cardboard, or the like.

SUMMARY OF THE INVENTION

The present invention relates to a polymer complex that comprises a water-soluble polymer (host polymer) and one or more water-soluble monomers that are polymerized in the presence of said water-soluble host polymer.

By definition, a water-soluble compound ((co)polymer, monomer, etc.) is a compound that gives an aqueous solution when it is dissolved with stirring at 25° C. and with a concentration of 50 grams per liter ($g \cdot L^{-1}$) in water.

More precisely, the present invention provides a polymer complex that is obtained by polymerizing water-soluble monomers in the presence of at least one water-soluble host polymer that comprises vinylamine functions and of at least one non-polymeric transfer agent and in the absence of a branching or crosslinking agent of the ethylenic polyfunctional type.

The polymer complex is obtained as from a mass ratio of anionic monomer to water that is greater than 0.035. This ratio is determined using the following formula:

$$\frac{\text{mass of anionic monomer}}{\text{total mass of water}}$$

This refers to the quantity of the anionic monomer(s) added to form the polymer complex in the presence of the host polymer. It does not refer to zwitterionic monomers or to any eventual anionic or zwitterionic monomers of the host polymer.

The total quantity of water corresponds to the quantity of water present initially while the polymer complex is being formed by polymerizing monomer(s) in the presence of the host polymer, and this applies regardless of the type of polymerization implemented (emulsion, gel, solution, etc.) and regardless of the origin of the water (monomers in solution, host polymer in solution, etc.).

The mass ratio of anionic monomer to water is advantageously greater than 0.035 and less than or equal to 0.35, more advantageously greater than 0.035 and less than or equal to 0.25, and even more advantageously greater than 0.035 and less than or equal to 0.15.

The total quantity of water available corresponds to the water coming from the host polymer, from the various monomers, and from the various additives.

In the resulting complex, the polymer(s) resulting from the polymerization of the monomers branch with the host polymer. It is not a mixture of polymers but rather a complex in which the host polymer plays the role of crosslinker or branching agent, during the polymerization of the monomers.

The transfer agent makes it possible, in particular, to limit the crosslinking associated with the host polymer and to control the length of the polymer chains formed during the polymerization of the water-soluble monomers.

The term "polymer" means a homopolymer or a copolymer resulting from polymerization respectively of identical monomers or of distinct monomers.

Another aspect of the invention is the use of this polymer complex as a dry strength agent in the field of making papers, cardboards, or the like.

Host Polymer

The host polymer preferably comprises vinylamine functions, i.e. the polymer is of the polyvinylamine type: —(CH$_2$—CH(NH$_2$))—.

The host polymer comprising vinylamine functions may result from various methods known to the person skilled in the art. In particular, it may be:
- a polymer resulting from Hofmann degradation on a "base polymer"; or
- a polymer resulting from total or partial hydrolysis of an N vinylformamide homopolymer or copolymer.

Polyvinylamines Resulting from Hofmann Degradation

Hofmann degradation is a reaction discovered by Hofmann in the late nineteenth century, and that makes it possible to convert an amide (or indeed an acrylonitrile) into a primary amine by elimination of carbon dioxide. The reaction mechanism is given in detail below.

In the presence of a base (sodium hydroxide), a proton is taken from the amide.

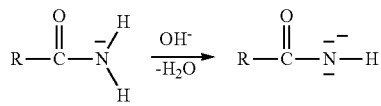

For hypochlorite, the amidate ion formed then reacts with the active chlorine (Cl$_2$) of the hypochlorite (e.g.: NaClO that is in equilibrium: 2 NaOH+Cl$_2$⇌NaClO+NaCl+H$_2$O) to give an N-chloramide. The Brønsted base (e.g. NaOH) takes a proton from the chloramide to form an anion. The anion loses a chloride ion to form a nitrene, which undergoes a rearrangement into an isocyanate.

By reaction between the hydroxide ion and the isocyanate, a carbamate is formed.

After decarboxylation (removal of CO$_2$) from the carbamate, a primary amine is formed:

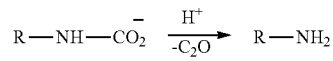

For converting all or some of the amide functions of a polymer into amine functions, two main factors are involved (expressed in mole ratios). They are:
- Alpha=(alkali metal and/or alkaline earth metal hypohalide/amide); and
- Beta=(alkali metal and/or alkaline earth metal hydroxide/alkali metal and/or alkaline earth metal hypohalide).

The hypohalide (also referred to as "hypohalite") is advantageously NaClO.

In a preferred embodiment, the polymer comprising vinylamine functions results from the Hofmann degradation performed on a "base polymer" comprising a non-ionic monomer chosen from the group comprising acrylamide or a derivative thereof.

Among the derivatives of acrylamide, mention can be made of N-isopropylacrylamide, N,N-dimethylacrylamide, methylacrylamide, and N-vinylpyrrolidone. The preferred monomer is acrylamide.

In accordance with the invention, the proportion of acrylamide monomer or derivatives in the "base polymer" lies in the range 30 mole percent (mol %) to 100 mol %, preferably in the range 50 mol % to 95 mol %, and even more preferably in the range 60 mol % to 90 mol %, relative to the total number of monomers in the "base polymer".

The "base polymer" may also contain cationic and/or anionic monomers.

The cationic monomers that may be used in the context of the invention may be chosen, in particular, from quaternary ammonium salts of monomers of the acrylamide, acrylic, vinyl, allylic or maleic type. Mention may be made, in particular and in non-limiting manner, of quaternized dimethylaminoethyl acrylate (DMAEA), quaternized dimethylaminoethyl methacrylate (DMAEMA), diallyldimethylammonium chloride (DADMAC), acrylamido propyltrimethyl ammonium chloride (APTAC), and methacrylamido propyltrimethyl ammonium chloride (MAPTAC). A preferred cationic monomer is DADMAC.

The quaternization of the monomers, such as DMAEA or DMAEMA, may, in particular be achieved by means of an alkyl halide, e.g. a methyl halide, and advantageously methyl chloride.

In accordance with the invention, the proportion of cationic monomer in the "base polymer" lies in the range 0 mol % to 70 mol %, preferably in the range 5 mol % to 50 mol %, and even more preferably in the range 10 mol % to 40 mol %, relative to the total number of monomers in the "base polymer".

The anionic monomer(s) that may be used in the context of the invention may be chosen from a broad group. These monomers may have acrylic, vinyl, maleic, fumaric, or allylic functions, and may contain a carboxylate, phosphonate, phosphate, sulfate or sulfonate group, or some other group having an anionic charge. The monomer may be acidic or else in the form of a corresponding alkaline earth metal, alkali metal, or ammonium salt of such a monomer. Examples of suitable monomers include acrylic acid, methacrylic acid, itaconic acid, crotonic acid, maleic acid, fumaric acid, and monomers of the strong acid type having, for example, a function of the sulfonic acid or phosphonic acid type, such as 2-acrylamido 2-methylpropane sulfonic acid, vinylsulfonic acid, vinylphosphonic acid, allylsulfonic acid, allylphosphonic acid, styrene sulfonic acid, and alkali metal, alkaline earth metal, and ammonium salts of these monomers that are soluble in water. A preferred monomer is acrylic acid.

In accordance with the invention, the proportion of anionic monomer in the "base polymer" lies in the range 0 mol % to 70 mol %, preferably in the range 2 mol % to 50 mol %, and even more preferably in the range 5 mol % to 30 mol %, relative to the total number of monomers in the "base polymer".

In accordance with the invention, the alpha factor of the host polymer lies advantageously in the range 0.1 to 1, preferably in the range 0.3 to 0.9, and even more preferably in the range 0.5 to 0.8.

In another embodiment of the invention, it is possible to use polyvinylamines obtained by Hofmann degradation performed on a polymer comprising acrylamide or derivatives thereof, and at least one polyfunctional compound containing at least 3 heteroatoms chosen from among N, O, S, and P, each having at least one mobile hydrogen.

The polyfunctional compound is incorporated before or during polymerization of the constituent monomers of the "base polymer".

Preferably, the polyfunctional compound is chosen from the group comprising polyethyleneimine, polyamine, and polyallylamine.

Polyvinylamines Resulting from Total or Partial Hydrolysis of an N-Vinylformamide Polymer In a first step, an N-vinylformamide (NVF) polymer is obtained, the NVF having the following unit:

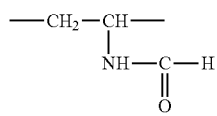

Subsequently, this NVF unit is converted, by hydrolysis, into vinylamine:

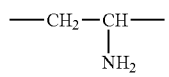

The hydrolysis may be performed by action of an acid (acidic hydrolysis) or by action of a base (basic hydrolysis). Depending on the quantity of acid or of base that is added, the NVF polymer is partially or totally converted into vinylamine.

Advantageously, the degree of hydrolysis lies in the range 1% to 100%, and even more advantageously it lies in the range 30% to 90%. In other words, 30 to 90 NVF groups are converted into amine groups per 100 starting NVF groups.

Preferably, the N-vinylformamide (NVF) polymer comprises at least one non-ionic monomer and/or at least one cationic monomer and/or at least one anionic monomer. The monomers that may be used in the context of the invention may be chosen from among the lists mentioned above.

In a preferred embodiment, in addition to the vinylamine monomer, the host polymer further comprises at least one non-ionic monomer and at least one cationic monomer. Preferably, the polymer further comprises acrylamide and DADMAC.

In accordance with a preferred characteristic of the invention, the host polymer may be branched.

The branching is preferably performed during (or optionally after) the polymerization of the monomers constituting the host polymer, in the presence of a polyfunctional branching agent and optionally of a transfer agent.

A non-limiting list of branching agents follows: methylene bis acrylamide (MBA), ethylene glycol diacrylate, polyethylene glycol dimethacrylate, diacrylamide, cyanomethyl acrylate, vinyloxyethyl acrylate, vinyloxymethacrylate, triallylamine, formaldehyde, glyoxal, and compounds of the glycidyl ether type, such as ethylene glycol diglycidyl ether, or epoxies. Advantageously, the branching agent is methylene bis acrylamide (MBA).

In practice, the branching agent is advantageously added at a proportion of from five to fifty thousand (5 to 50,000) parts per million by weight relative to the active material (weight of the monomers constituting the host polymer), preferably from 5 to 10,000 ppm, and advantageously from 5 to 5,000 ppm.

Transfer agents that make it possible to limit the length of the polymer chains may also be present during the polymerization of the monomers constituting the host polymer. A non-limiting list of transfer agents follows: isopropyl alcohol, sodium hypophosphite, and mercaptoethanol.

In accordance with the invention, the host polymer has a molecular weight of at least 10,000 g/mol, preferably of at least 50,000 g/mol, and even more preferably of at least 100,000 g/mol. This is the mean molecular weight by weight.

The Polymer Complex

It results from polymerization of water-soluble monomers, during which the pre-existing host polymer acts as a crosslinking or branching agent.

In addition to the at least one anionic monomer, the water-soluble monomer(s) implemented during the preparation of the polymer complex may, in particular, be a non-ionic monomer and/or at least one cationic monomer.

The quantity of non-ionic monomer(s) lies advantageously in the range 1 mol % to 99 mol %, preferably in the range 10 mol % to 80 mol %, and even more preferably in the range 20 mol % to 60 mol %, relative to the number of water-soluble monomers.

The quantity of anionic monomer(s) lies advantageously in the range 1 mol % to 99 mol %, preferably in the range 10 mol % to 80 mol %, and even more preferably in the range 20 mol % to 60 mol %, relative to the number of water-soluble monomers.

The quantity of cationic monomer(s) lies advantageously in the range 0 mol % to 99 mol % of cationic monomer, preferably in the range 0 mol % to 60 mol %, and even more preferably in the range 0 mol % to 20 mol %, relative to the number of water-soluble monomers.

As already indicated, this polymerization is implemented in the presence of at least one non-polymeric transfer agent. Advantageously, the molecular weight of the non-polymeric transfer agent is less than 200 g/mol. In addition, the polymerization of the monomers is also performed in the absence of branching or crosslinking agent of the ethylene polyfunctional type.

The term "branching or crosslinking agent of the ethylene polyfunctional type" means agents including a bifunctionalized, trifunctionalized, or tetrafunctionalized polyvinyl or polyallyl group.

At least one non-polymeric transfer agent implemented during the polymerization of the water-soluble monomer(s) is advantageously chosen from the group comprising isopropyl alcohol, sodium hypophosphite, and mercaptoethanol.

Depending on the nature of the transfer agent, the quantity of said transfer agent that is added lies advantageously in the range 1 ppm to 150,000 ppm, preferably in the range ppm to 10,000 ppm, and more preferably in the range 100 ppm to 5000 ppm by weight relative to the weight of the water-soluble monomers implemented.

The various monomers that are implemented may be chosen from among the respective lists mentioned above in the description of the host polymer (Hofmann degradation and hydrolysis).

In accordance with the invention, the proportion of water-soluble monomers implemented is advantageously as follows, relative to the total number of water-soluble monomers implemented:
- in the range 1 mol % to 99 mol % of non-ionic monomer, preferably in the range 10 mol % to 80 mol %, and even more preferably in the range 20 mol % to 60 mol %; and/or
- in the range 1 mol % to 99 mol % of anionic monomer, preferably in the range 10 mol % to 80 mol %, and even more preferably in the range 20 mol % to 60 mol %; and/or
- in the range 0 mol % to 99 mol % of cationic monomer, preferably in the range 0 mol % to 60 mol %, and even more preferably in the range 0 mol % to 20 mol %;

the total number of water-soluble monomers representing 100%.

In a preferred embodiment, at least one non-ionic monomer and at least one anionic monomer are implemented. They are preferably acrylamide and acrylic acid.

The complexes of the present invention differ, in particular, from the prior art by the fact that at least one non-polymeric transfer agent is present during the polymerization of the water-soluble monomers in the presence of the host polymer. Specifically, the presence of the transfer agent makes it possible to limit the crosslinking of the polymer resulting from the polymerization of the water-soluble monomers with the host polymer, while also controlling the molecular weight of the polymer chains that are formed.

The mass ratio between the host polymer and the monomers lies advantageously in the range 0.01 to 4, more advantageously in the range 0.01 to 3.75, even more advantageously in the range 0.5 to 3.75, preferably in the range 0.75 to 3.5, and even more preferably in the range 1 to 3. This mass ratio may also lie in the range 0.5 to 4. It is the mass ratio between the host polymer and all of the monomers being polymerized in the presence of said host polymer.

In accordance with the invention, the complex dissolved to form a solution at 8% by weight of dry polymer has transmittance that is preferably less than 70%, more preferably less than 55%, and even more preferably less than 40%. The transmittance is measured at a concentration in water of 8% by dry weight of the polymer complex.

The transmittance values are measured by means of an instrument of the DR 3900 (HACH) UV-photometer type on an aqueous solution of 8% by dry weight of dry polymer. Transmittance corresponds to the percentage of light transmitted through a sample having a thickness of 1 cm in a quartz tank, at a wavelength of 750 nanometers (nm). Transmittance values are advantageously measured at 25° C.

In general, preparation of the polymer complex of the invention does not require any particular polymerization method development. Indeed, this complex can be obtained using any of the polymerization techniques that are well known to the person skilled in the art. In particular, the polymerization may be solution polymerization, gel polymerization, precipitation polymerization, (aqueous or inverse) emulsion polymerization, suspension polymerization, or micellar polymerization.

The method of preparing the polymer complex may comprise the following steps:
- preparing a mixture comprising at least one host polymer, at least one type of water-soluble monomer, and at least one non-polymeric transfer agent; and
- obtaining the polymer complex by polymerization of the water-soluble monomers.

The method of preparing the polymer complex may comprise the following steps:
- preparing a mixture comprising at least one host polymer, and at least one non-polymeric transfer agent;
- adding at least one type of water-soluble monomer by continuously pouring it/them into the mixture; and
- obtaining the polymer complex by polymerization of the water-soluble monomers.

The method of preparing the polymer complex may comprise the following steps:
- preparing a mixture comprising at least one host polymer;
- adding at least one type of water-soluble monomer, and at least one non-polymeric transfer agent by continuously pouring them into the mixture; and
- obtaining the polymer complex by polymerization of the water-soluble monomers.

The method of preparing the polymer complex may comprise the following steps:
- adding at least one polymer host, at least one type of water-soluble monomer, and at least one non-polymeric transfer agent by continuously pouring them into the reactor; and
- obtaining the polymer complex by polymerization of the water-soluble monomers.

The polymer complex may be in powder, liquid, or emulsion form. Preferably, the complex is in liquid form.

Preferably, during the preparation of the complex, the host polymer is fed into the reactor with the monomers and with the non-polymeric chain transfer agent. The polymerization is then advantageously initiated by adding catalysts.

Another aspect of the invention is the use of the polymer complexes as dry strength agents in the field of making papers, cardboards, or the like.

Surprisingly, it has been found that using the complexes of the invention as dry strength agents makes it possible to greatly improve the mechanical properties of the sheet in the dry state in the context of making papers, cardboards, or the like.

Without wishing to put forward any theory, it would appear that the grafting of the polymer resulting from polymerization of the water-soluble monomers to the host polymer makes it possible to obtain products that have improved performance as dry strength agents.

The complex may be used in the form of a diluted or undiluted aqueous solution.

The quantity of complex that is added lies advantageously in the range 3 g of active material/metric ton (T) of paper (dry weight of advantageously cellulose fibers) to 10,000 g/T, preferably in the range 10 g/T to 7000 g/T, and even more preferably in the range 30 g/T to 3000 g/T.

In addition to the complex, other compounds known to the person skilled in the art may be associated. By way of non-limiting example, mention may be made of dispersants, biocides, or indeed antifoaming agents.

Another aspect of the invention relates to a method of making paper, cardboard or the like, in which method, prior to forming said sheet, at least one complex of the invention is added to the fiber suspension (advantageously a suspension of cellulose fibers) at one or more injection points.

This method may further comprise adding polymers that are distinct from the complex of the invention. By way of example, mention may be made of coagulants, retention agents, flocculants, or indeed starch.

The various steps of the method of making paper, cardboard, or the like comply with the techniques that are part of the knowledge of the person skilled in the art.

The following examples illustrate the invention without, however, limiting it.

IMPLEMENTATIONS OF THE INVENTION

Synthesizing a Complex of the Polymer P of the Invention 570 g of host polymer (commercially available product HF31 (SNF SAS), active material=10.5%) referred to in the examples as X1 (30 mol % of DADMAC/70 mol % of acrylamide) was added to a 1-liter reactor equipped with a mechanical stirrer, with a thermometer, with a condenser and with a gaseous nitrogen dip tube. 44 g of acrylamide (solution at 50% by weight) and 25 g of acrylic acid (solution at 90% by weight), as well as 0.9 g of sodium hypophosphite chain transfer agent were added. The temperature was adjusted to 30° C. and the catalysts i.e. 0.44 g of sodium persulfate, 0.11 g of sodium metabisulfite, and 0.03 g of Mohr's salt, were then injected into the reaction medium. By means of the reaction exothermicity, the temperature of the reaction medium rose to the temperature of 45° C. During the conversion of the monomers, a whitish veil appeared that became a precipitate, finally forming a completely white dispersion. After 45 minutes of maturation at 45° C., 2 g of sodium bisulfite (solution at 40% by weight) was added so as to make any residual monomers react. Further maturation for 45 minutes at 45° C. was applied before cooling.

The resulting solution of complex (product P) had a pH of 2.9, a solids content of 26.2%, and a viscosity of 450 cps. This complex polymer remained stable, without any phase separation, for at least 12 months.

Synthesizing the Polymer X2

555 g of deionized water, 127 g of acrylamide (solution at 50% by weight), 71 g of acrylic acid (solution at 90% by weight) and 71 g of sodium hydroxide 50% (solution at 50% by weight) were added to a 1-liter reactor equipped with a mechanical stirrer, with a thermometer, with a condenser, and with a gaseous nitrogen dip tube. The temperature was adjusted to 35° C. 0.9 g of sodium hypophosphite, 0.17 g of VA 044 (2,2'-azobis[2-(2-imidazolin-2-yl)propane]dihydrochloride) and 0.08 g of V 50 (2,2'-azobis(2-methylpropionamidine)dihydrochloride) were then injected rapidly. By means of the reaction exothermicity, the temperature of the reaction medium rose to the temperature of 75° C. After 45 minutes of maturation at 45° C., 2 g of sodium bisulfite (solution at 40% by weight) was added so as to make any residual monomers react. Further maturation for 45 minutes at 45° C. was applied before dilution with 1173 g of water for cooling to 25-30° C.

By means of this method, an anionic polymer was obtained that had a pH of 6.3, a solids content of 7.4%, and a viscosity of 250 cps.

Procedures for Assessment Tests

Measuring Transmittance:

Aqueous solutions containing 8% by weight of dry polymer were prepared. The transmittance values were measured at a wavelength of 750 nm by using an instrument of the DR 3900 (HACH) UV-photometer type. Transmittance corresponds to the percentage of light transmitted through a sample having a thickness of 1 cm.

Dry Strength Performance:

The paper hand sheets or "formettes" for testing were produced using an automatic dynamic former. Firstly, the paper pulp was prepared by disintegrating 90 g of recycled cardboard fibers in 2 liters of hot water for 25 minutes. The resulting pulp was then diluted in water to a volume of 6 liters. Once the consistency had been measured accurately, the required quantity of the pulp was taken in such a manner as to obtain ultimately a sheet with a grammage of 90 grams per square meter (g/m$^2$).

The pulp was then fed into the chest of the dynamic former, diluted to a consistency of 0.5%, and stirred moderately with a mechanical stirrer in order to homogenize the aqueous suspension.

A blotter and the forming fabric were placed in the bowl of the dynamic former before starting the bowl rotating at 1000 revolutions per minute (rpm) and forming the wall of water. The various dry strength agents were then added to the fiber suspension being stirred with a contact time of 30 seconds for each polymer. The sheet was then formed by 23 back-and-forth movements of the nozzle projecting the pulp into the wall of water. Once the water had been drained and once the automatic sequence had finished, the forming fabric with the network of fibers formed was removed from the bowl of the dynamic former and placed on a table. A dry blotter was placed on the same side as the wad of damp fibers, and was pressed once using a roller. The resulting assembly was turned over and the fabric was delicately separated from the fibrous wad. A second dry blotter was deposited and the sheet (between the two blotters) was pressed under a press delivering 4 bars, and was then dried on a tensioned drier for 9 minutes at 117° C. The two blotters were then removed and the sheet was stored overnight in a room with controlled humidity and temperature (50% relative humidity and 23° C.). The dry strength properties of all of the sheets obtained using this procedure were assessed.

The burst index was measured using a Messmer Buchel M 405 burst tester (mean of 12 measurements).

In all of the following examples, and unless otherwise indicated, the sheets of paper were formed using the above procedure while adding the dry strength agent at a dosage of 1.5 kg/t (kilograms of dry polymer per metric ton of dry fibers).

TABLE 1

Comparison of DSR performance and transmittance

| Test No. | Product | Dosage (kg/t) | Improvement in the burst index (%) | Transmittance (%) | Mass ratio of anionic monometer to water |
|---|---|---|---|---|---|
| 0 | Blank | 0 | Reference | NA | NA |
| 1 | X1 | 1.5 | 6.3 | 98.4 | NA |
| 2 | X2 | 1.5 | 3.7 | 99.2 | NA |
| 3 | Mixture X1/X2 | 1.5 | NA | NA | 0.0163 |

TABLE 1-continued

Comparison of DSR performance and transmittance

| Test No. | Product | Dosage (kg/t) | Improvement in the burst index (%) | Trans- mittance (%) | Mass ratio of anionic monometer to water |
|---|---|---|---|---|---|
| 4 | (57.5%/42.5% by dry weight P (INVENTION) | 1.5 | 21.7 | 0.1 | 0.0458 |
| 5 | X3 | 1.5 | 5.1 | 82.4 | 0.0150 |
| 6 | X4 | 1.5 | 1.4 | 99.8 | 0 |
| 7 | N | 1.5 | 6.7 | 99.5 | 0.0169 |
| 8 | M | 1.5 | NA | NA | 0.0169 |
| 9 | Q | 1.5 | 6.5 | 99.4 | 0.0177 |

(The dosages are expressed in quantity of dry polymer relative to the dry pulp)
X1: Copolymer resulting from Hofmann degradation of a DADMAC/AM copolymer (30 mol %/70 mol %) with an alpha factor = 0.7 (corresponds to the host polymer of product P).
X2: AA/AM copolymer (50 mol %/50 mol %).
P: Polymer complex of the invention (570 g of X1/44.5 g of monomers).
X3: Mixture of polymers: polyamine/X2 (15%/85% by dry weight), the polyamine being branched and of the dimethylamine/ethylenediamine/epichlorohydrin type as disclosed in U.S. Pat. No. 7,001,953 (WSP).
X4: Polymer of the PVAm-graft-PAM type (PVAm/PAM: 30 mol/70 mol) as disclosed in U.S. Pat. No. 5,753,759 (BASF).
N: Polymer complex as disclosed in Patent U.S. Pat. No. 9,546,246 B2 (SNF SAS) (% solids content: 35.2%; viscosity: 9600 cps).
M: Product synthesized as the polymer complex N was, but without any transfer agent being used.
Q: Product synthesized as the polymer complex P was, but with a mass ratio of anionic monomer to water = 0.0177.
VAm = vinylamine
DADMAC = diallyldimethylammonium chloride
AM = acrylamide
AA = acrylic acid
NVF = N-vinylformamide In tests 1 and 2 of table 1, it can be observed that the use of the host polymer (X1), or of the secondary polymer (X2), alone, did not afford any significant improvement in dry strength performance compared with the reference test (blank).

The best dry strength performance was obtained with test 4, which corresponded to use of the product P of the invention, and which outclassed the products of the state of the art.

In terms of chemical nature and of ionic ratios, the mixture X1/X2 (test 3) corresponded to the product P of the invention (test 4). The mixture X1/X2 (test 3) was in the form of a coacervate that was not stable when stored and that solidified at room temperature after 24 hours.

The products X3 and X4 (tests 5 and 6) and the product N, disclosed respectively in U.S. Pat. No. 7,001,953 (WSP) and U.S. Pat. No. 5,753,759 (BASF), and in U.S. Pat. No. 9,546,246 B2 (SPCM SA), did not procure dry strength performance that was equivalent compared with the dry strength performance of the product P of the invention.

During the synthesis of the product M, a compact gel was obtained that made it impossible to test.

The product Q (test 9) that corresponded to a product synthesized as the polymer complex P was, but with a mass ratio of anionic monomer to water of 0.0177, was in the form of a translucent liquid having transmittance of 99.4%, and developed dry strength performance that was low compared with the dry strength performance of the product of the invention P (test 4).

The invention claimed is:

1. A polymer complex that is obtained by polymerizing water-soluble monomers: in the presence of a water-soluble host polymer that comprises vinylamine functions and of a non-polymeric transfer agent, and in the absence of a branching or crosslinking agent of the ethylenic polyfunctional type, wherein said polymer complex is obtained as from a mass ratio of anionic monomer to water that is greater than 0.035, and wherein the polymer complex has transmittance of less than 70% at a concentration in water of 8% by dry weight of polymer complex.

2. The polymer complex according to claim 1, wherein the mass ratio of the host polymer to the monomers lies in the range 0.01 to 3.75.

3. The polymer complex according to claim 1, wherein the non-polymeric transfer agent is chosen from the group consisting of isopropyl alcohol, sodium hypophosphite, and mercaptoethanol.

4. The polymer complex according to claim 1, wherein the host polymer comprising vinylamine functions results from hydrolysis of a homopolymer or of a copolymer of N vinylformamide.

5. The polymer complex according to claim 1, wherein the host polymer comprising vinylamine functions results from the Hofmann degradation reaction on a base polymer.

6. The polymer complex according to claim 5, wherein the base polymer comprises at least one non-ionic monomer chosen from the group consisting of acrylamide and derivatives thereof.

7. The polymer complex according to claim 5, wherein the base polymer comprises at least one polyfunctional compound containing at least 3 heteroatoms from among N, O, S, P, each of which has at least one mobile hydrogen.

8. The polymer complex according to claim 5, wherein the base polymer comprises at least one polyfunctional compound chosen from the group consisting of polyethyleneimine, polyamine, and polyallylamine.

9. The polymer complex according to claim 1, wherein the constituent monomers of the host polymer and the water-soluble monomers comprise monomers chosen from the group consisting of:
   acrylamide, N-isopropylacrylamide, N,N-dimethylacrylamide, N-vinylformamide, and N-vinylpyrrolidone;
   quaternary ammonium salts of dimethylaminoethyl acrylate (DMAEA), quaternary ammonium salts of dimethylaminoethyl methacrylate (DMAEMA), diallyl dimethylammonium chloride (DADMAC), acrylamido propyltrimethyl ammonium chloride (APTAC), and methacrylamido propyltrimethyl ammonium chloride (MAPTAC); and
   acrylic acid, methacrylic acid, itaconic acid, crotonic acid, maleic acid, fumaric acid, 2-acrylamido 2-methylpropane sulfonic acid, vinylsulfonic acid, vinylphosphonic acid, allylsulfonic acid, allylphosphonic acid, styrene sulfonic acid, and water-soluble salts of an alkali metal, of an alkaline earth metal, or of ammonium of these monomers.

10. A method of making a sheet of paper or cardboard, said method comprising, prior to forming said sheet, adding to a fiber suspension at one or more injection points a polymer complex that is obtained by polymerizing water-soluble monomers: in the presence of a water-soluble host polymer that comprises vinylamine functions and of a non-polymeric transfer agent, and in the absence of a branching or crosslinking agent of the ethylenic polyfunctional type, wherein said polymer complex is obtained as from a mass ratio of anionic monomer to water that is greater than 0.035, and wherein the polymer complex has transmittance of less than 70% at a concentration in water of 8% by dry weight of polymer complex.

11. The polymer complex according to claim 1, wherein the complex has transmittance of less than 55% at a concentration in water of 8% by dry weight of polymer complex.

12. The polymer complex according to claim 1, wherein the complex has transmittance of less than 40% at a concentration in water of 8% by dry weight of polymer complex.

13. The polymer complex according to claim 1, wherein the mass ratio of the host polymer to the monomers lies in the range 0.75 to 3.5.

14. The polymer complex according to claim 1, wherein the mass ratio of the host polymer to the monomers lies in the range 1 to 3.

15. The polymer complex according to claim 11, wherein the non-polymeric transfer agent is chosen from the group consisting of isopropyl alcohol, sodium hypophosphite, and mercaptoethanol.

16. The polymer complex according to claim 2, wherein the non-polymeric transfer agent is chosen from the group consisting of isopropyl alcohol, sodium hypophosphite, and mercaptoethanol.

17. The polymer complex according to claim 6, wherein the base polymer comprises at least one polyfunctional compound containing at least 3 heteroatoms from among N, O, S, P, each of which has at least one mobile hydrogen.

18. The polymer complex according to claim 6, wherein the base polymer comprises at least one polyfunctional compound chosen from the group consisting of polyethyleneimine, polyamine, and polyallylamine.

19. The polymer complex according to claim 11, wherein:
the mass ratio of the host polymer to the monomers lies in the range 0.01 to 3.75;
the non-polymeric transfer agent is chosen from the group consisting of isopropyl alcohol, sodium hypophosphite, and mercaptoethanol;
the host polymer comprising vinylamine functions results from the Hofmann degradation reaction on a base polymer;
the base polymer comprises at least one non-ionic monomer chosen from the group consisting of acrylamide and derivatives thereof; and
the base polymer comprises at least one polyfunctional compound containing at least 3 heteroatoms from among N, O, S, P, each of which has at least one mobile hydrogen.

* * * * *